United States Patent [19]

Heredia

[11] Patent Number: 5,351,409
[45] Date of Patent: Oct. 4, 1994

[54] KEY IDENTIFIER METHOD AND APPARATUS

[75] Inventor: George Heredia, Paradise Valley, Ariz.

[73] Assignee: Axxess Entry Technologies, Tempe, Ariz.

[21] Appl. No.: 991,302

[22] Filed: Dec. 16, 1992

[51] Int. Cl.$^5$ .............................................. G01B 5/20
[52] U.S. Cl. ........................................ 33/539; 33/501
[58] Field of Search ................... 33/501, 501.05, 539, 33/540; 70/460; 76/110

[56] References Cited

U.S. PATENT DOCUMENTS

| | | | |
|---|---|---|---|
| D. 251,365 | 3/1979 | Lipinski | D10/4 |
| D. 257,758 | 1/1981 | Limacher | D8/5 |
| 466,044 | 12/1891 | Jacobs | . |
| 2,707,335 | 5/1955 | Falk | 33/174 |
| 2,940,183 | 6/1960 | Fromberg | 35/50 |
| 3,172,969 | 3/1965 | Haggstrom | 200/61.59 |
| 5,127,532 | 7/1992 | Cimino et al. | 76/110 |
| 5,167,171 | 12/1992 | Heredia | 76/110 |

OTHER PUBLICATIONS

American Consumer Products, Inc., Cole Consumer Products Division, Cleveland, Ohio 44105; "Key Locator Book, A Complete Guide To Quick, Easy And Correct Key Selection", pp. 1–72, Dec. 1988.

*Primary Examiner*—Thomas B. Will
*Attorney, Agent, or Firm*—Cahill, Sutton & Thomas

[57] ABSTRACT

A key identifier enables an operator to select a key blank design functionally compatible with an unknown key by directing the operator to implement a primary classification step followed by a secondary classification step to sort an unknown key into a specified secondary classification category. The key identifier operator then implements a key blade matching procedure within the specified secondary classification category where the cross section of the blade of the unknown key is matched with a defined blade cross sectional configuration. When a match is obtained between the unknown key blade configuration and the known blade configuration, the known key blank design can be identified and a compatible key blank can be selected.

55 Claims, 12 Drawing Sheets

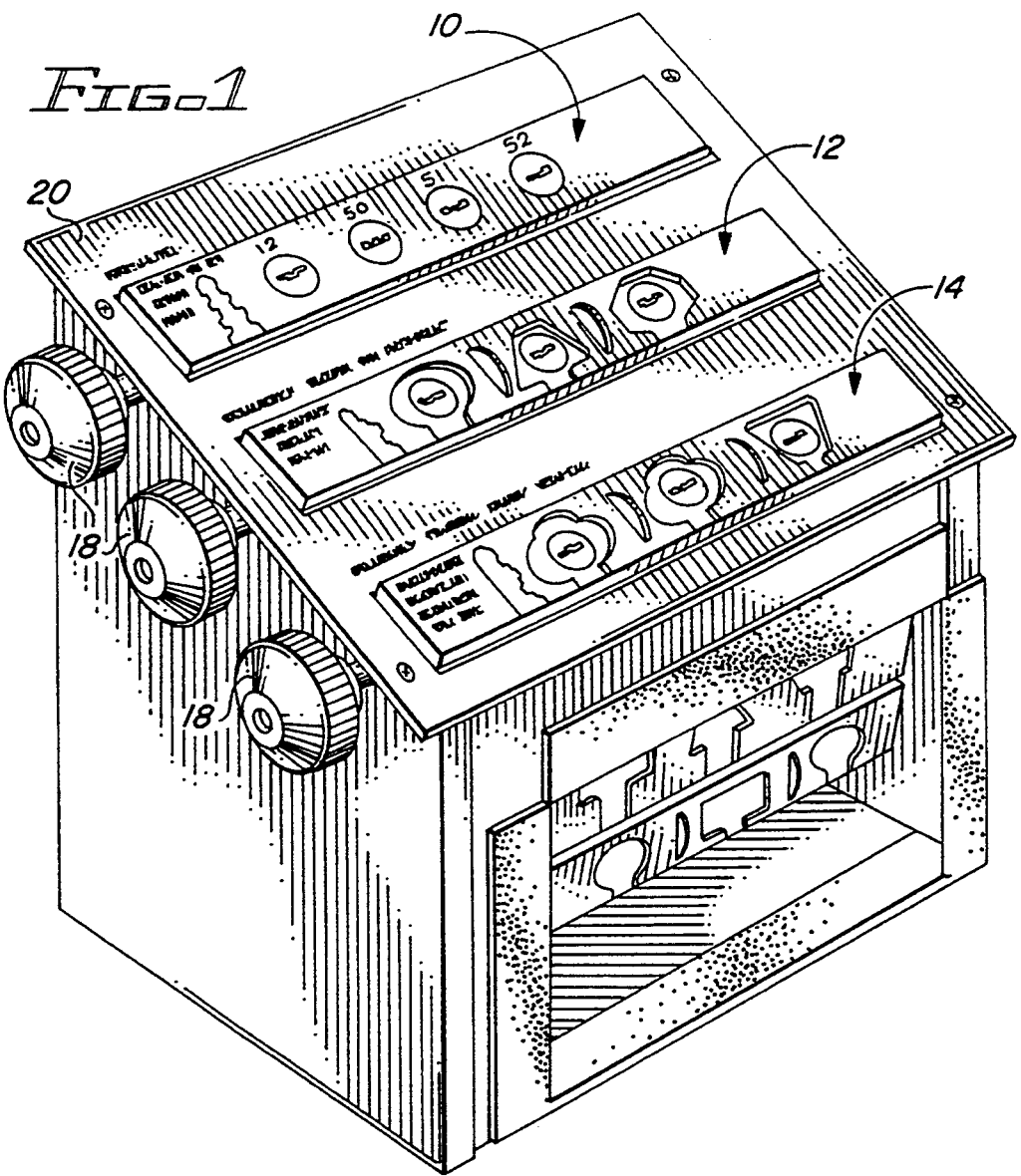

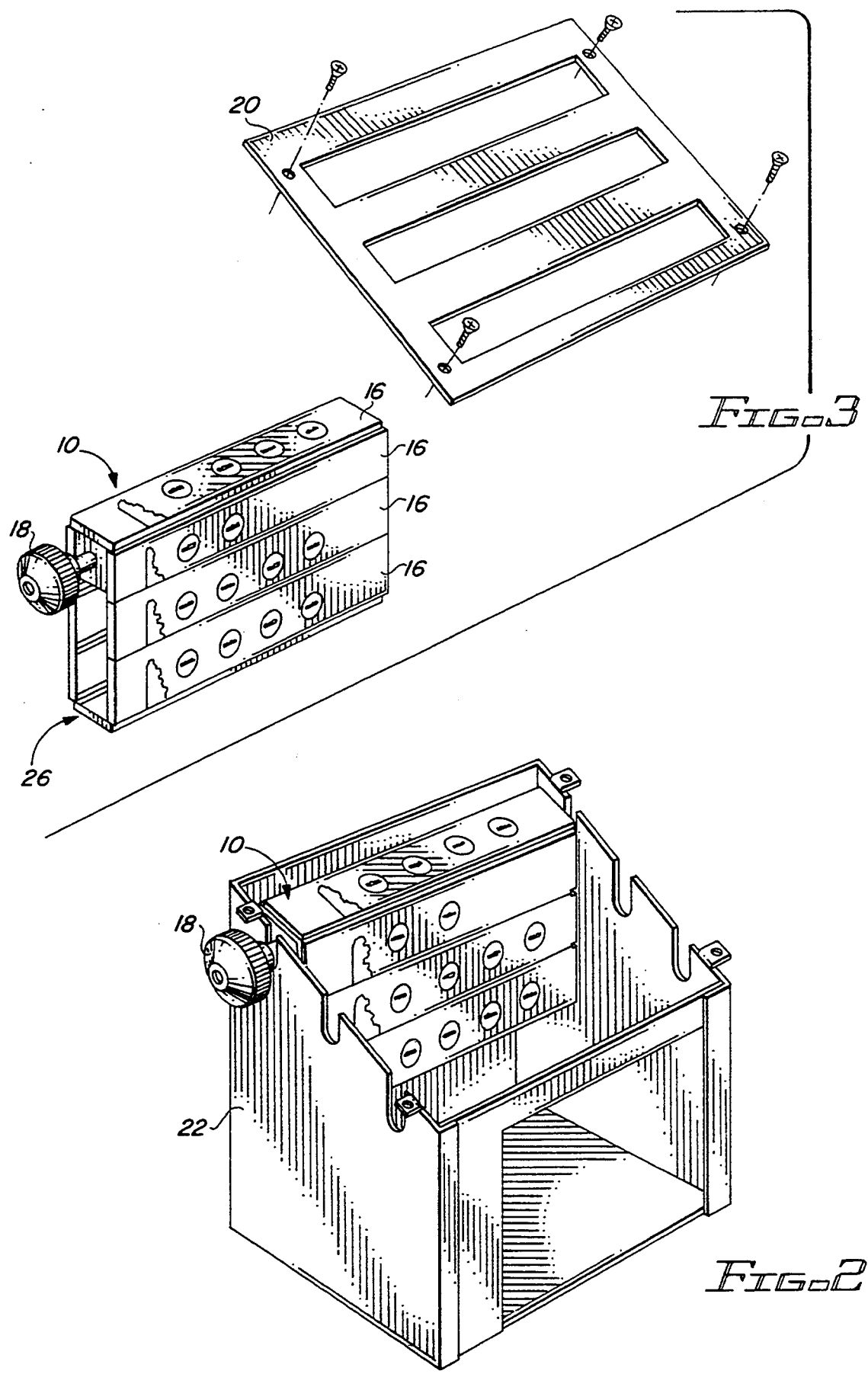

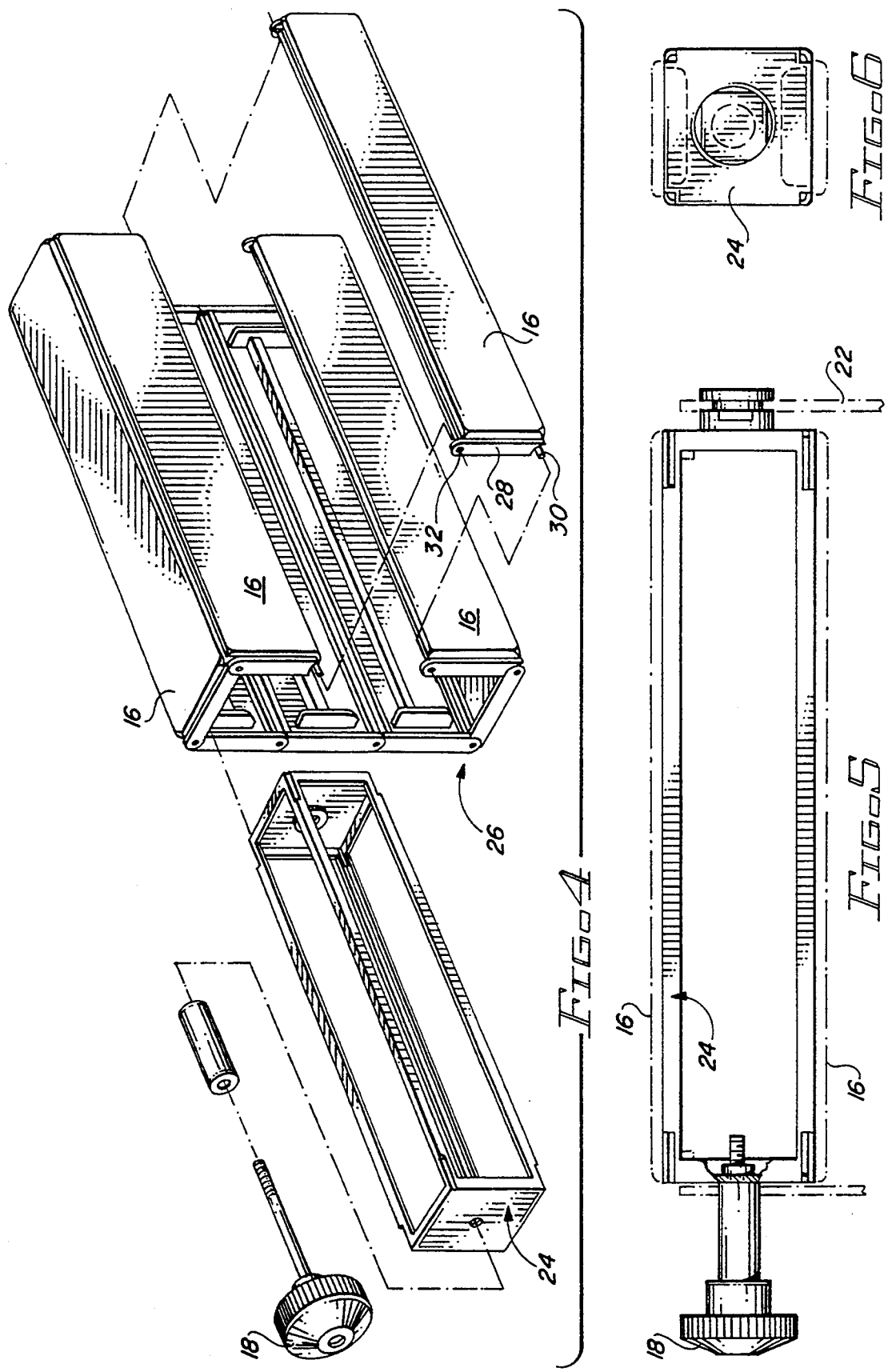

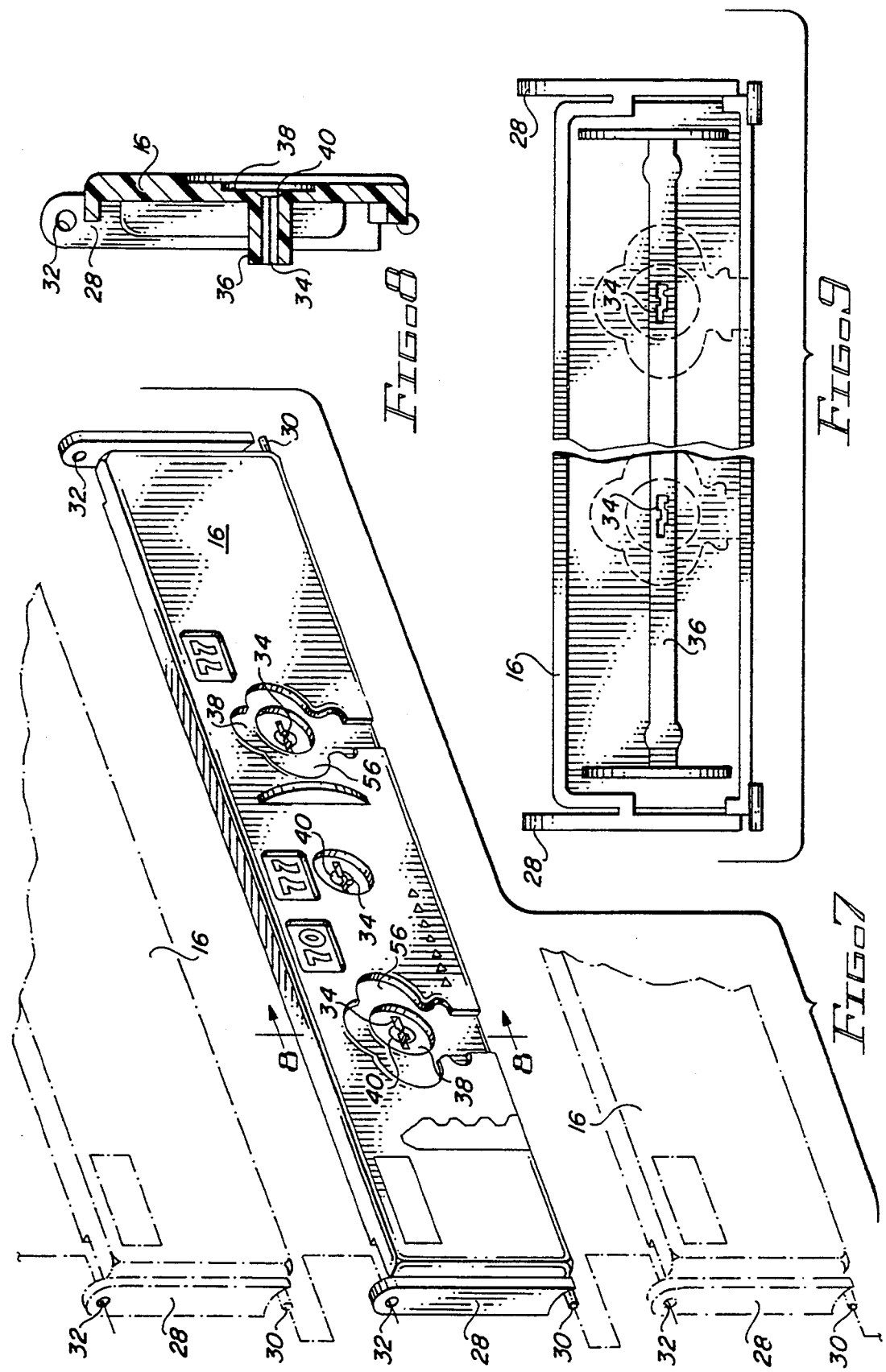

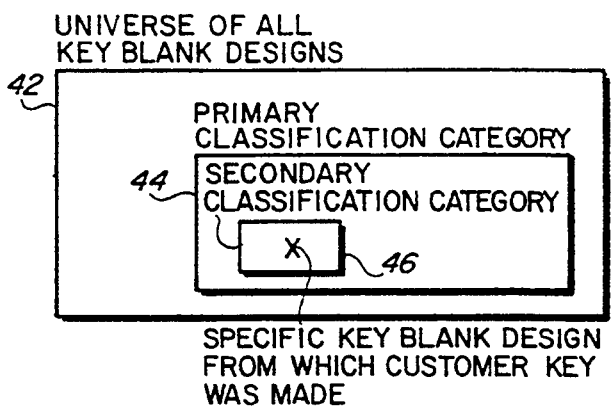
FIG. 15
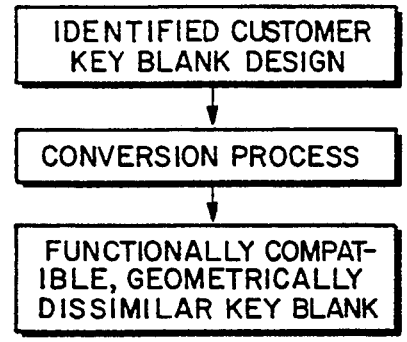
FIG. 16
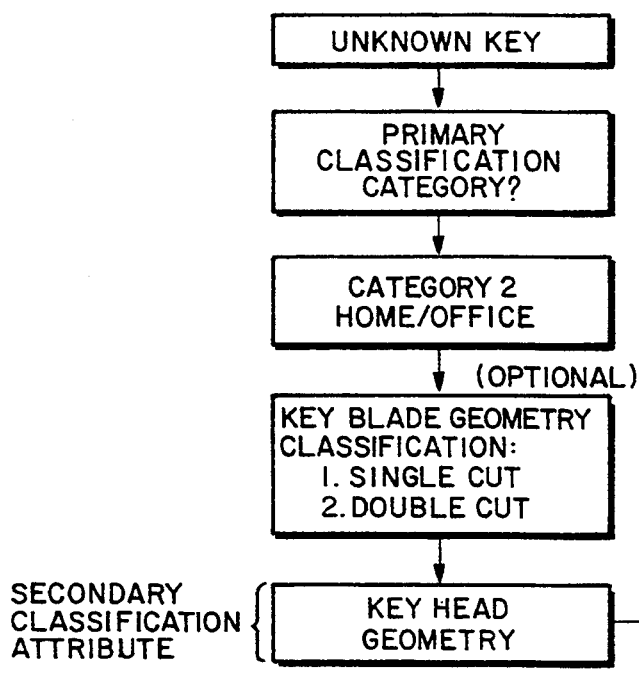
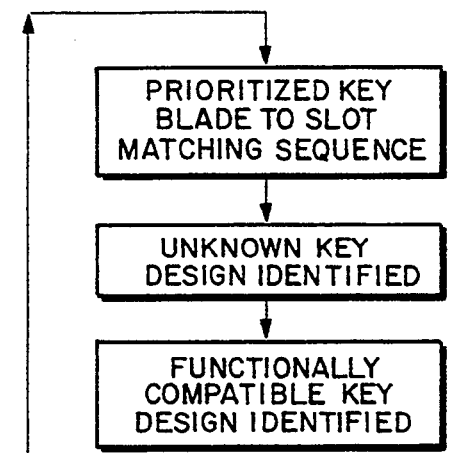
FIG. 18
FIG. 19
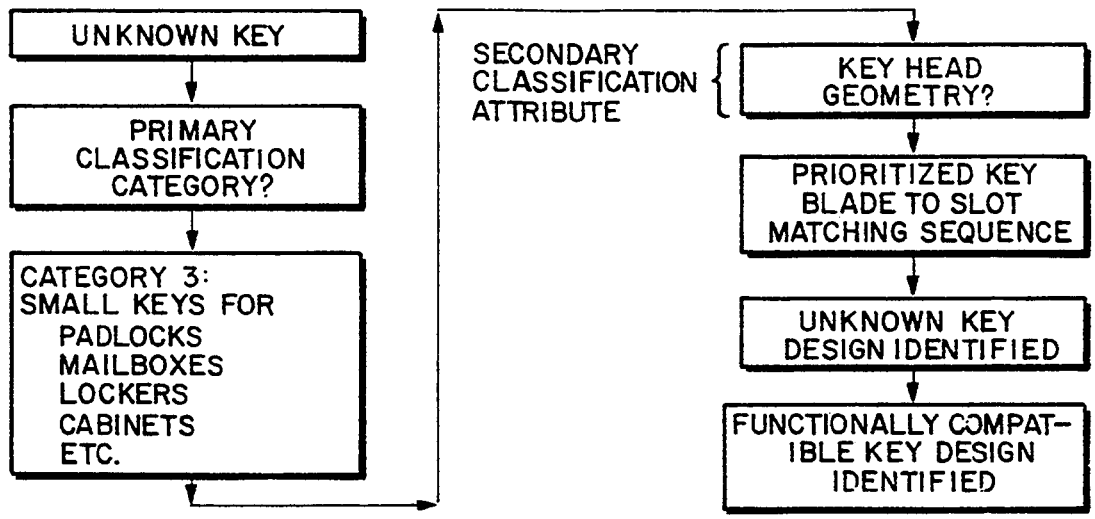

KEY IDENTIFIER METHOD AND APPARATUS

BACKGROUND OF THE INVENTION

1. Field of the Invention

This invention relates to key identifier systems, and more particularly, to key identifier systems which utilize sequentially implemented key classification techniques.

2. Description of the Prior Art

When a customer presents an unknown key to a locksmith, the first step of the key duplication process involves selecting a key blank geometrically identical to the unknown key. Once that key blank identification process has been completed, the locksmith using conventional techniques duplicates the bit notch pattern of the unknown key onto the identical key blank.

Prior art key identification techniques typically involve visually observing the unknown key and comparing it on a trial and error basis with a relatively unclassified group of key blanks having different geometric configurations. When the locksmith actually possesses in his inventory a geometrically identical key blank, this trial and error visual identification process typically results within a matter of seconds or minutes in locating that geometrically identical key blank.

This prior art key identification technique can be very frustrating as well as unreliable. As described above, this system involves a trial and error selection by a human operator who, when searching a relatively large inventory of available key blanks, may not locate an available, but unobserved duplicate key blank. In addition, human operators somewhat frequently select a key blank which is in fact not precisely identical to the unknown key. The resulting duplicate key produced on a non-identical key blank will not operate the customer's lock, resulting in a high level of customer dissatisfaction.

SUMMARY OF THE INVENTION

It is therefore a primary object of the present invention to provide a key identifier method and apparatus which utilizes a low cost mechanical device to implement a sequential series of key classification operations on an unknown key to reliably and quickly identify a functionally compatible key blank which can be used to duplicate the bit notch pattern of the unknown key.

Another object of the present invention is to provide a key identifier method and apparatus which can be used to specifically identify a key blank functionally compatible with an unknown key without comparing any geometric element of the unknown key to any geometric element of the functionally compatible key blank.

Another object of the present invention is to provide a key identifier method and apparatus which can select a key blank functionally compatible with an unknown key where the compatible key blank is geometrically dissimilar to the unknown key.

Another object of the present invention is to provide a key identifier method and apparatus which is inexpensive to manufacture, which can be used with minimal operator training and which identifies an unknown key with absolute reliability.

Another object of the present invention is to provide a key identifier method and apparatus which initially classifies an unknown key into either an automobile category, a home/office category or a small key category.

Briefly stated, and in accord with one embodiment of the invention, a method provides for the selection of a key blank functionally compatible with an unknown key having an identified primary classification category, a secondary classification attribute and a key blade with a defined cross sectional configuration. The selected key blank design is functionally compatible with, but not necessarily geometrically identical to a key blank from which the unknown key was cut. The key identification method commences with identifying the primary classification category of the unknown key to sort the unknown key into a specified primary classification category. Within the specified primary classification category, the unknown key is further sorted by the secondary classification attribute into a specified secondary classification category. A key blade matching procedure is implemented within the specified secondary classification category where the cross sectional configuration of the unknown key blade is compared with at least one cross sectional configuration corresponding to a known blade cross sectional configuration of a known key blank design to determine whether the cross sectional configuration of the unknown key blade matches the known cross sectional configuration. The desired known key blank design is identified when the key matching procedure yields a match between the unknown key blade cross sectional configuration and the known cross sectional configuration.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 1 represents a preferred embodiment of a key identifier according to the present invention.

FIGS. 2 and 3 taken together represent a partially exploded view of the key identifier illustrated in FIG. 1.

FIG. 4 represents a partially exploded perspective view of one of the groups of key identifier panels of the key identifier of the present invention.

FIG. 5 represents a sectional view of the groups of key identifier panels illustrated in FIG. 2.

FIG. 6 represents an end view of the group illustrated in FIG. 5.

FIG. 7 represents an enlarged perspective view of a single key identification panel, illustrating the manner in which that single panel is interconnected with the other linked together panels of a single group of panels.

FIG. 8 is an end view of the key identification panel illustrated in FIG. 7.

FIG. 9 is a partially cutaway elevational view of the key identification panel illustrated in FIG. 7

FIG. 15 is a logic diagram explaining the logical steps involved in using the key identifier of the present invention.

FIG. 16 is a flow chart explaining a part of the key identification process of the present invention.

FIG. 18 is a detailed flow chart relating to the identification of a home/office key.

FIG. 19 is a detailed flow chart relating to the identification of small keys for specific types of lock applications.

DESCRIPTION OF THE PREFERRED EMBODIMENT

Figure 10A:
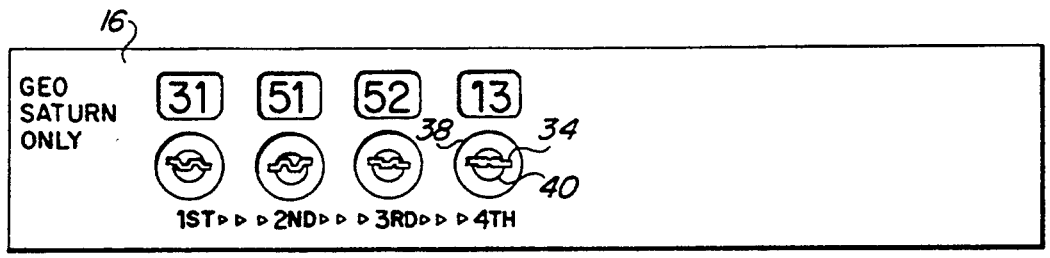
FIGS. 10A–10K illustrate the series of eleven key identification panels used to identify automotive keys.
Figure 10B:
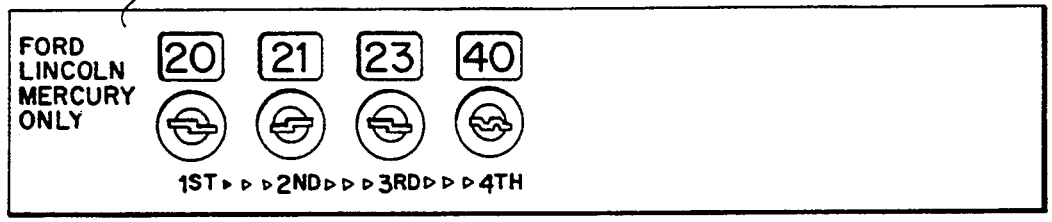

In order to better illustrate the advantages of the invention and its contributions to the art, a preferred hardware embodiment of the invention will now be described in some detail. Referring first to FIGS. 1–9, the structural configuration of a preferred embodiment of a key identifier of the present invention will now be described.

FIGS. 1 and 2 particularly illustrate that the key identifier system of the present invention is generally subdivided into a first group of key identifier panels 10, a second group of key identifier panels 12 and a third group of key identifier panels 14. As will be explained below, the first group of panels is configured to identify automotive keys; the second group of panels is configured to identify home/office keys; and the third group of panels is configured to identify small keys for small locks such as padlocks, mailboxes, lockers, cabinets and related lock applications.

As illustrated in the FIG. 2/3 exploded perspective view, each group of key identifier panels consists of a series of discrete rectangular key identifier panels 16 which are linked together in a tank tread configuration. Each group of panels is connected to a rotary actuator 18 which is manipulated by an operator to cause a specific key identifier panel to be displayed on the inclined face 20 of the key identifier system. All three groups of key identifier panels are supported by a single support Stand 22.

FIGS. 4, 5 and 6 generally illustrate the relatively straightforward mechanical structure which provides the desired rotary motion of the individual key identifier panels 16 of each group of key identifier panels. Rotary actuator 18 is coupled to drive element 24 which interfaces with the interior surfaces of individual panel element 16 to assist in providing the desired rotary motion of the linked-together series of the panel elements 16. As most clearly illustrated in FIG. 2, the continuous belt of each group of key identifier panels is driven only at the top by rotary actuator 18 and drive element 24 while the bottom or lowermost section of each group of key identifier panels generally designated by reference number 26 is freely suspended. This unique configuration allows for future expansion of an individual group of key identifier panels to increase the key identification capacity of each discrete group of key identifier panels. As will be explained below, the present embodiment of the invention includes the largest number of key identifier panels in the first group 10, an intermediate number of panels in the second group 12 and the smallest number of panels in the third group 14.

FIGS. 7, 8 and 9 illustrate the linkage elements 28 disposed at the opposing ends of each discrete key identifier panel 16 where a pin 30 interfaces with an adjacent aperture 32 to provide the articulated interconnecting linkage between adjacent panels 16. FIG. 4 best illustrates the series of panels 16 configured in the linked-together, articulated relationship utilized in the presently preferred embodiment of the invention.

As illustrated in FIG. 7, the front surface of each panel 16 includes a series of spaced apart slots 34 which extend for a substantial depth into an elongated rib 36 disposed along the entire length of the rear surface of each panel 16 as illustrated in FIGS. 8 and 9. The extension of slots 34 throughout the entire length or depth of rib 36 forms a series of elongated key ways for receiving the blade of an unknown key to be identified. This elongated key way design is important because it effectively provides an elongated slot such that slot wear and erosion at the key way entry point does result in degraded accuracy.

As illustrated in FIGS. 7 and 8, each slot 34 is formed within a circular recess 38 disposed into the surface of each panel 16. In addition, a bullet-shaped indentation having a circular perimeter configuration designated by reference number 40 is disposed at varying lateral positions relative to slots 34 within circular recess 38 to provide a lead-in for the tip of the unknown key to significantly facilitate inserting or efforts to insert the tip of an unknown key into each of the key identification slots 34.

FIGS. 15 and 16 explain an overall procedural background regarding the unique structure and operation of the key identifier of the present invention. FIG. 15 includes large rectangle 42 to logically symbolize the substantial universe of all key blank designs. Intermediate size rectangle 44 designates a primary subclassification category which according to the method of the present invention subcategorizes the universe of all key blank designs into the substantially smaller primary classification category. Further implementation of the present invention reclassifies a customer's unknown key design into a secondary classification category designated by reference number 46 which further categorizes or classifies a customer's unknown key into a relatively small and highly manageable subset of unknown keys within which as symbolized by the "x," the specific key blank design from which the customer key was made can be identified.

As illustrated by the FIG. 16 flow chart, a conversion process may be used to translate the identified customer original key blank design into a functionally compatible, but potentially geometrically dissimilar key blank design. The design and structure of such functionally compatible, but structurally dissimilar key blanks ("universal" key blanks) is disclosed in allowed U.S. Pat. No. 5,167,171, entitled "UNIVERSAL KEY BLANK AND KEY DUPLICATION METHOD." The disclosure of that allowed patent is hereby incorporated by reference.

The manner in which the key identifier method and apparatus of the present invention implements the generalized procedural process outlined in FIGS. 15 and 16 will now be described in connection with FIGS. 10A–10K, taken in combination with the FIG. 17 flow chart.

The series of eleven key identifier panels 16 depicted in FIGS. 10A–K are linked together in the key identifier apparatus illustrated in FIG. 1 to form the first group of key identifier panels 10 which serve to identify an unknown key provided by a customer which is identified by the customer as belonging to a primary classification category consisting of keys for automotive applications. The panels are fabricated from an acetal homopolymer such as DuPont Delrin, a hard, wear-resistant plastic material.

During the key identification process, the key identifier operator asks the customer to identify the primary classification category of the unknown key provided by the customer. As illustrated in the FIG. 16 flow chart, the present embodiment of the key identifier invention includes the following three primary classification categories: Category One—Automotive; Category Two—Home/Office; and Category Three—Small Keys, specifically keys for padlocks, mailboxes, lockers, cabinets, etc.

If the customer provides the key identifier operator with a key identified by the primary classification category of automotive, the key identifier operator directs and limits the key identification process to the first group of key identifier panels 10. The specific design of the face of each of these automotive key identification panels is precisely illustrated in FIGS. 10A–10K. Rescaling to full size can readily be implemented by relating those figures to a full size key.

Figure 17:
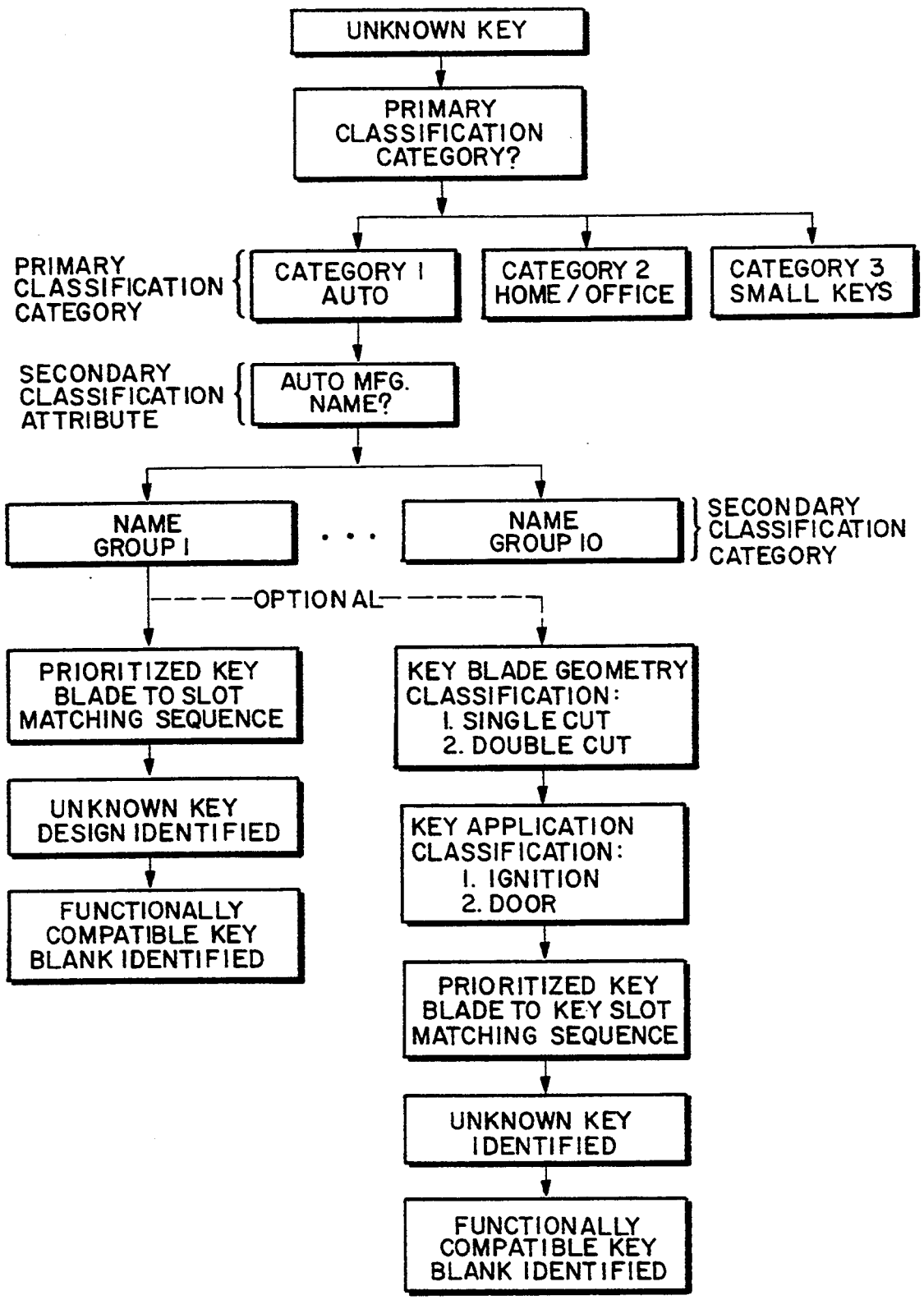
FIG. 17 is a detailed flow chart illustrating the primary classification step of the present invention and a detailed flow chart relating to the identification of automotive keys.

As illustrated in the FIG. 17 flow chart, the key identifier operator next asks the customer to identify a secondary classification attribute of the customer's automotive key, specifically, the name of the manufacturer of the automotive key which the customer's unknown key operates. As illustrated in FIG. 10, generally this manufacturer name identification directs the key identifier operator to a single panel. FIGS. 10J and 10K illustrate the single exception relating to GM, Chevy and Pontiac manufacturer names which require a search of both panels 10J and 10K. Panel 10J specifically relates to a group of seven General Motors automotive products having single sided or single cut keys as illustrated in the graphic single cut key outline symbol illustrated by reference number 48. FIG. 10J therefore represents a single key identifier panel relating to a first subset defined as "single cut keys" for specifically identified cars while the key identifier panel illustrated in FIG. 10K relates to a second subset of keys with three manufacturer names (GM, Chevy and Pontiac) including the subset defined as "double cut keys" as illustrated by the graphic symbol designated by reference number 50.

In FIG. 10J, the first subset of single cut keys is further subdivided into a third subset defined by key application criteria including "ignition keys" represented by the first four key identification slots on panel 10J and "door keys" represented by the fifth through eight slots on the key identification panel illustrated in FIG. 10J.

Referring now to the key identification panel illustrated in FIG. 10C and to the FIG. 13 flow chart, implementation of the key identification method of the present invention will now be described in connection with the identification of an unknown key provided by a customer who identifies one of the primary classification categories illustrated on the left hand side of the FIG. 10C key identification panel.

Figure 10C:
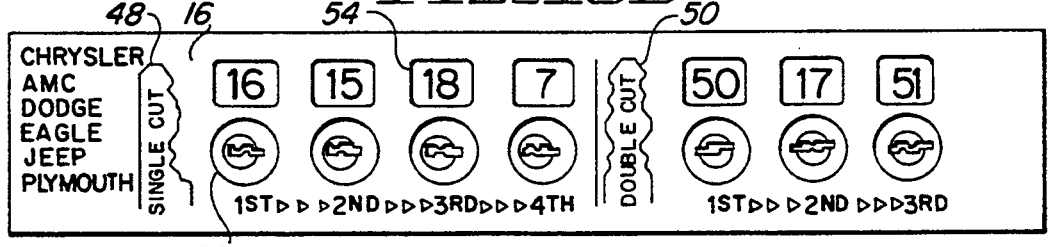
Figure 10D:
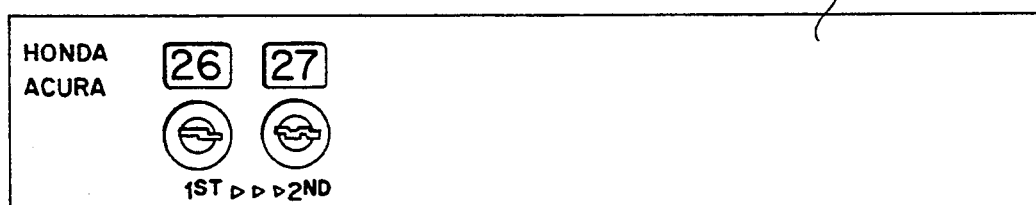
Figure 10E:
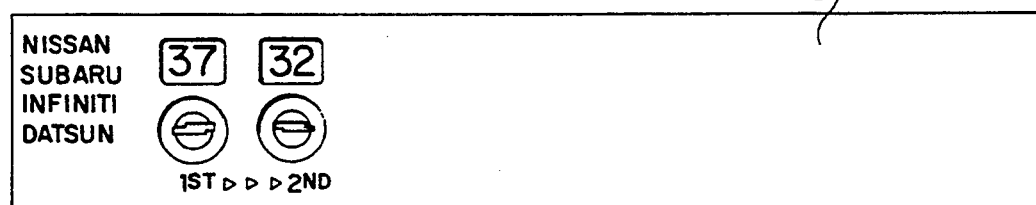
Figure 10F:
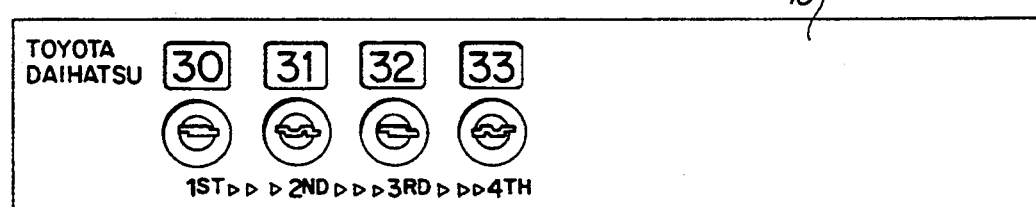
Figure 10G:
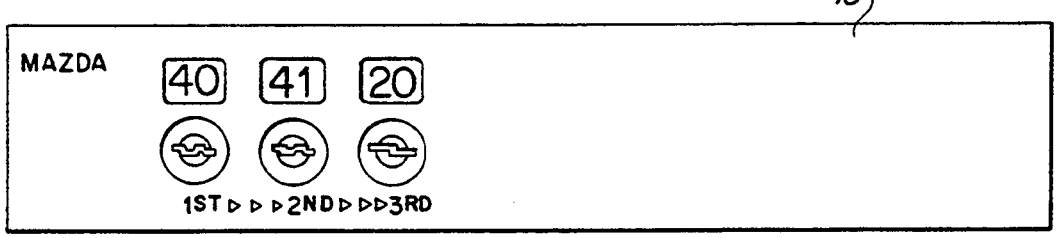
Figure 10H:
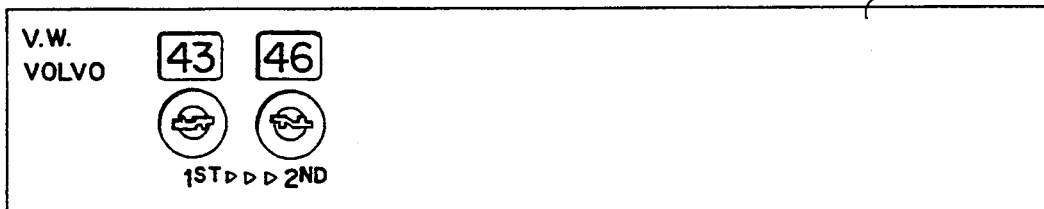
Figure 10I:
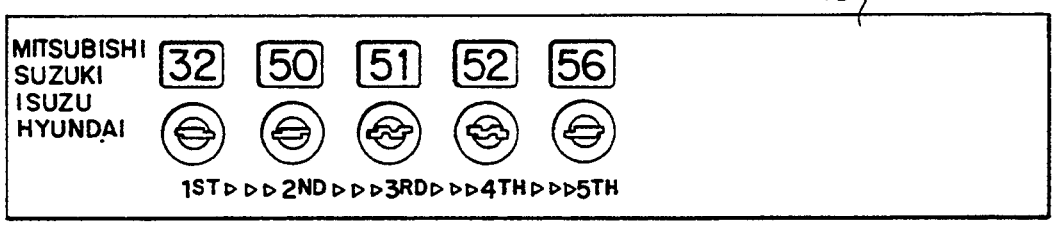
Figure 10J:
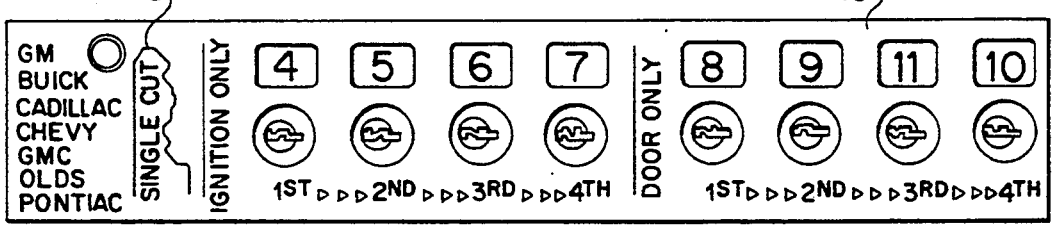
Figure 10K:
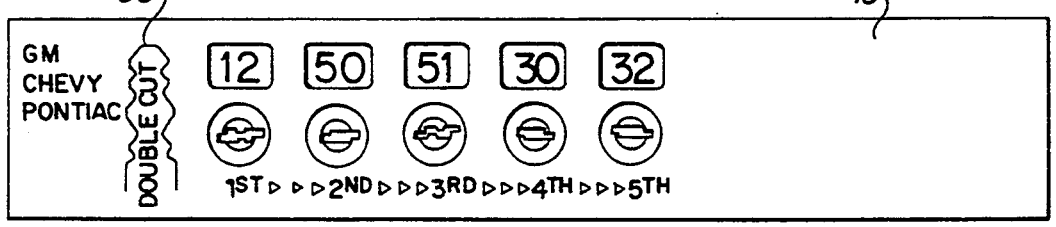
Figure 13:
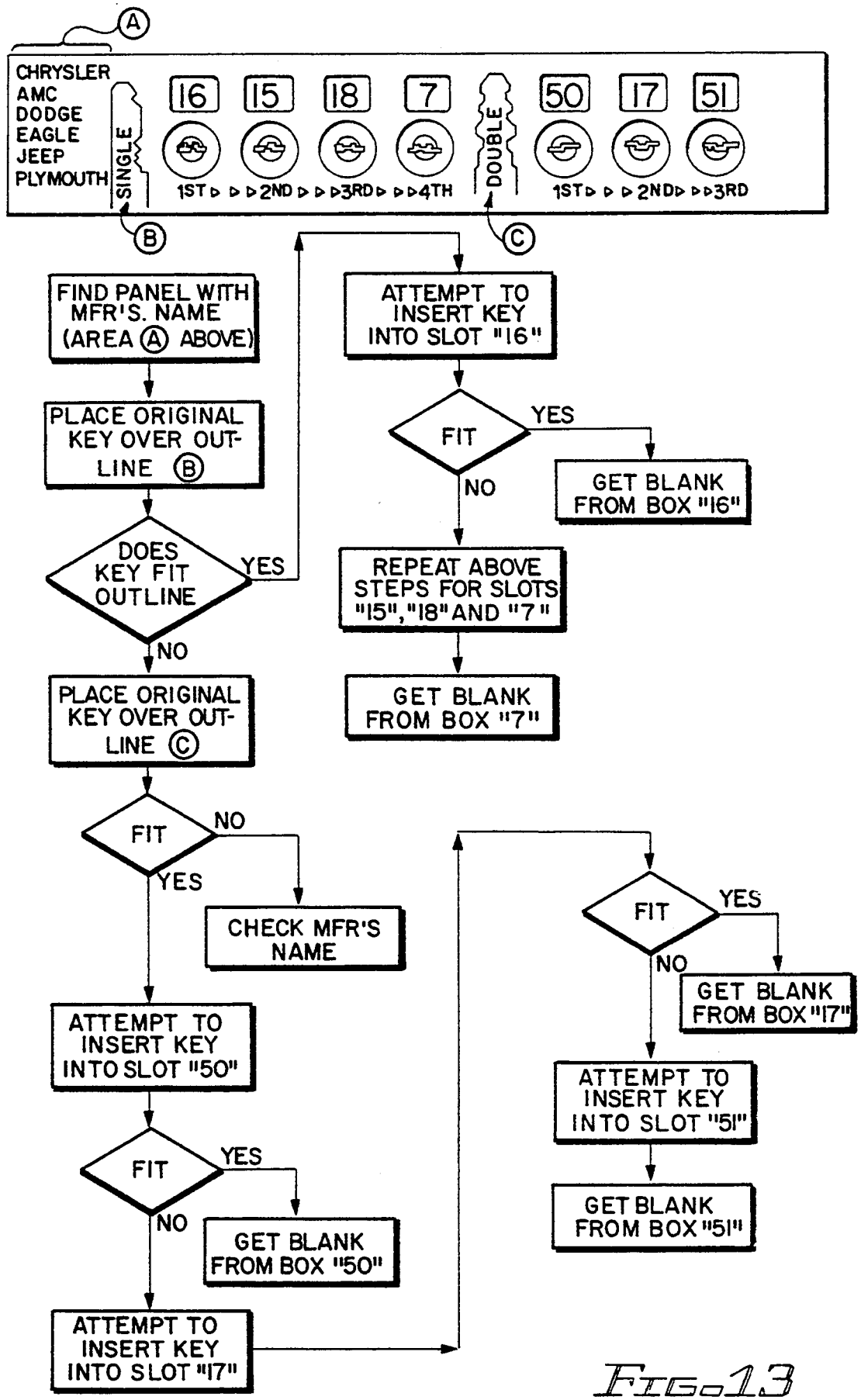
FIG. 13 represents a flow chart illustrating the identification of a specific type of automotive key.

Specifically as illustrated in FIG. 13, the key identifier operator first identifies the FIG. 10C panel as including primary classification category "automobiles" and the secondary classification attribute including a manufacturer's name selected from the class identified as including Chrysler, AMC, Dodge, Eagle, Jeep and Plymouth. The key identifier operator then relates the single cut/double cut characteristics of the unknown key to graphic symbols 48 and 50 to determine where to commence further key identification operations relating to that unknown key.

If the unknown key is a single cut key, the operator attempts to insert the tip of the unknown key into the first slot designated by reference number 52. The key identifier operator then commences a sequence-prioritized series of attempts to insert the tip of the unknown key into the first, second, third and finally the fourth slot on key identifier panel FIG. 10C. If the unknown key fits into the third slot, the numerical designator positioned immediately above the third slot and designated by reference number 54 identifies key blank "18" as a key blank which is functionally compatible with the customer-provided unknown key.

Had the customer provided an unknown key having a double cut configuration as illustrated by the double cut graphic 50 in FIG. 10C, the key identifier operator would have begun a sequence-prioritized series of attempts to insert the unknown key into the slot identified as the first slot, followed by the second and third slots. If the unknown key is successfully be inserted into the second slot, a match between the cross sectional configuration of the unknown key and the cross sectional configuration of that key identification slot indicates to the operator that known key blank "17" will serve as a functionally compatible key blank for duplicating the customer's unknown key.

The sequence-prioritized key implementation of the identification process as described above is critical in that in a number of instances, an unknown key can be inserted into more than one key identification slot. If the specific sequence-prioritized slot selection is not followed, the key identifier operator may be directed to a key blank which is not functionally compatible to the unknown key. For example in FIG. 10C key blank "16" will also fit into the slot for key blank "15." Similarly, key blank "50" will also fit into the slot for key blank "17."

The FIG. 13 flow chart taken together with the FIG. 10A–10K automotive key identifier panel layouts describe the currently preferred embodiment of the present invention and its procedural method. The FIG. 17 flow chart describes the method of the present invention in more conceptual terms. The left-most chain of the FIG. 17 block diagram relates to key identification panels such as those illustrated in FIGS. 10A, 10B, 19D and 10E where the prioritized key blade to slot matching sequence commences immediately upon identification of the automobile manufacturer name. For the more complex alternative operating modes of the key identification process of the present invention, the right hand vertical chain key identification functional block diagram under the designation "optional" requires more operator steps to identify other specified unknown key blank designs. Key blanks requiring such optional additional steps are illustrated on key identifier panels 10C, 10J and 10K which, as illustrated require additional classification steps before the sequence-prioritized key blade to slot matching sequence can be commenced.

The method and apparatus for identifying home/office keys will now be described in connection with FIGS. 11A–11G, 14, 17 and 18. FIGS. 11A–11G specifically illustrate the series of key identification panels 16 which are linked together to form the second group of key identification panels 12 as illustrated in FIG. 1. The identification of such keys falling within the home/office primary classification category require a different secondary classification attribute other than the automobile manufacturer name as was the case with the Category One primary classification of automotive keys. The reason for this difference is that while virtually all customers knew the brand name of the automobile to which an unknown key relates, very few customers know the brand name of home or office lock to which their unknown home/office key relates. Therefore for home/office unknown keys, an entirely different secondary classification attribute had to be created and implemented to successfully identify such unknown home/office keys.

Figure 11A:
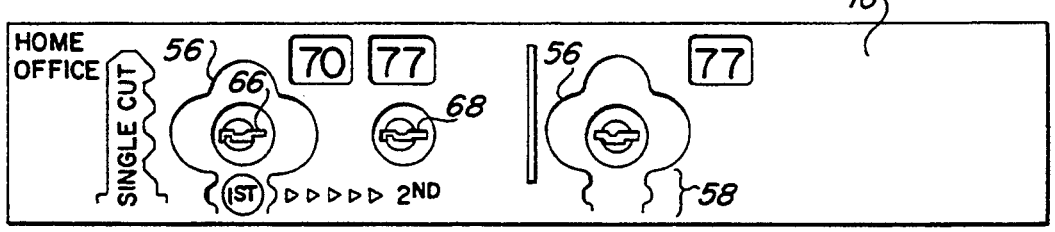
FIGS. 11A–11G illustrate the series of seven key identification panels used to identify home/office keys.
Figure 11B:
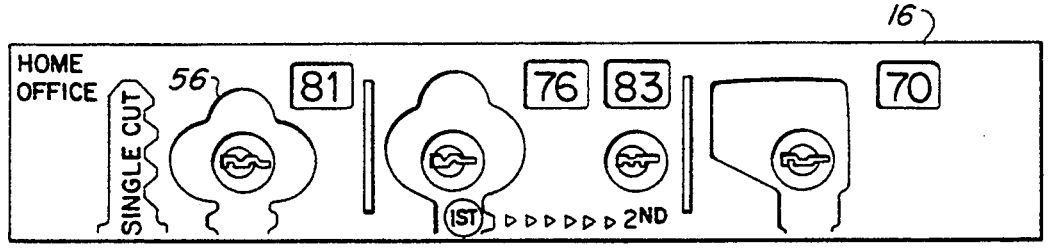
Figure 11C:
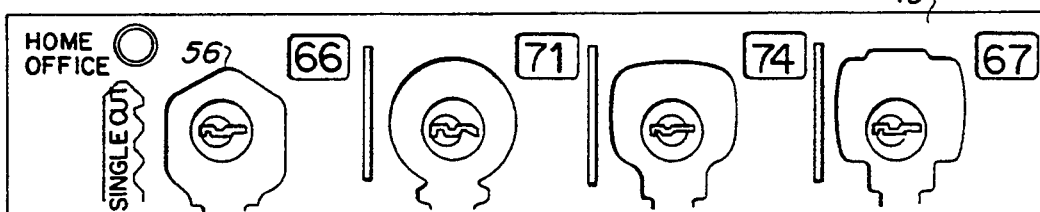
Figure 11D:
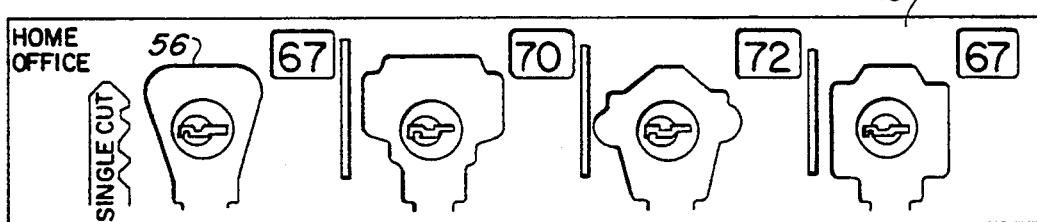
Figure 11E:
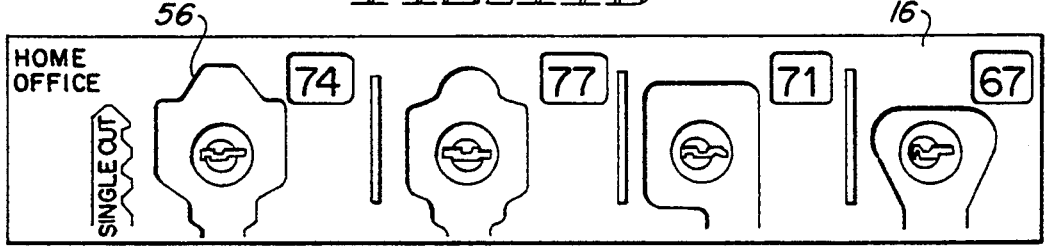

As illustrated in FIG. 11A, the secondary classification attribute for home/office keys is defined as the key head geometry of the customer's unknown key. As illustrated, for example, in FIG. 11A, a key head outline 56 is provided to allow the key identifier operator to identify the proper key identification panel on which the subsequent key identification steps are implemented. As illustrated in FIG. 7, key head outlines 56 are sunken or recessed into the face of each key identification panel 16 to create a chamber having a vertically oriented sidewall extending around the entire perimeter of the key head outline. As further shown in FIG. 7, as well as in the FIG. 11 sequence of panel face illustrations, the key head outline also includes a portion of the key shoulder designated by reference number 58 which interconnects the key head to the key blade. In some instances, such as key head outline 60 depicted in FIG. 11F, the key head outline includes not only a part of the key shoulder, but also a part of the key blade as designated by reference number 62.

The key head outlines 56 are carefully dimensioned to combine from at least two to as many as seven different key head geometries of commercial key head designs. Accordingly, no key head outline is a geometric duplicate of any one commercially available key head.

After being presented by a customer with an unknown key, the key identifier operator inquires as to the primary classification category of the unknown key. When the customer response indicates that the unknown key belongs to the home/office primary classification category, the operator directs his attention to the second group of key identification panels 12 and commences a sequential search to correlate the key head outline of the unknown key with a key head outline depicted as illustrated on the FIG. 11A–11G panels. Once a relatively close match between the key head outline of the unknown key and the key head outline 56 on the key identification panels is obtained, the key identification operator actually inserts the unknown key head into the chamber created by the recessed key head outlines in the face of key identification panel 16. The matching criteria in this application relates to whether the key identifier operator can insert the unknown key head into a flat configuration against the base of the chamber within key head outline 56 without undue movement or slop between the unknown key head and key head outline 56. An inability to position the head of an unknown key flat against the base of the key head outline 56 indicates a mismatch condition.

Once a match is obtained between the unknown key head and a selected key head outline 56, the key identifier operator next attempts to insert the blade of the unknown key into the slot 34 located in the base of the key head outline 56. For example, with the first key head outline/slot pair designated by reference number 64 in FIG. 11A, an inability to obtain a match between first slot 66 and the blade of the customer's unknown key indicates to the key identifier operator that he should move onto the sequence-prioritized second slot designated by reference number 68. Obtaining a match between the unknown key and second slot 68 relates to the unknown key to key blank "77" which can then be used in the following key duplication operation to create a duplicate key for the customer's unknown key. The sequence prioritized key slot matching remains critical even for home/office keys since, for example, in panel 11A, the "70" key blank will fit into the "77" slot.

Figure 11F:
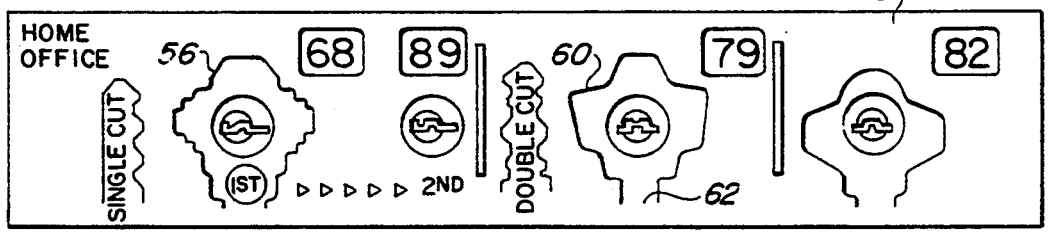
Figure 11G:
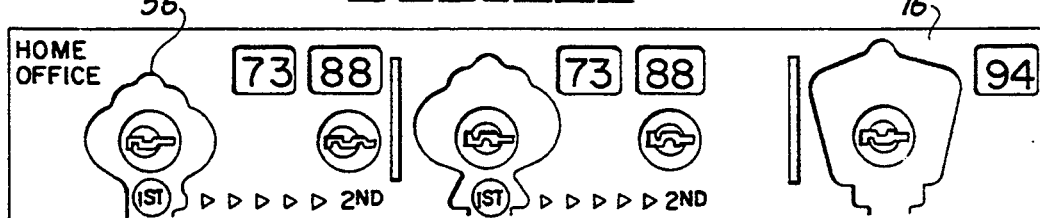

The key identification panels illustrated in FIGS. 11A–11G reveal that most home/office keys are single cut keys with the exception of the intermediate key head outline/paired slot designated in the central part of the FIG. 11F key identification panel.

The FIG. 18 flow chart explains the sequence of operation implemented by a key identifier operator for home/office key categories.

Figure 14:
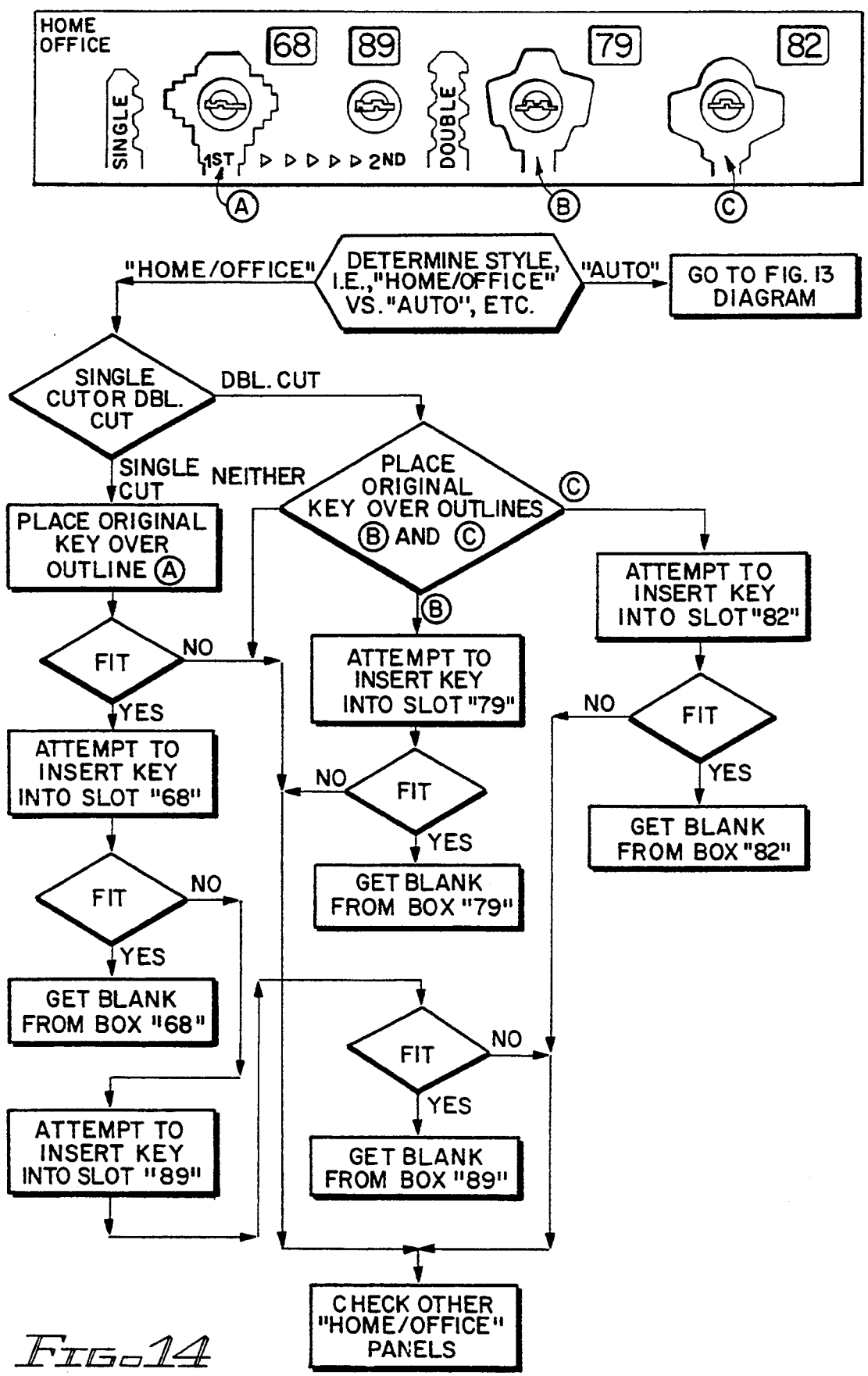
FIG. 14 is a flow chart illustrating the manner in which a home/office key is identified.

The FIG. 14 flow chart illustrates the particular procedural set of operations required to utilize the particular key identifier panel illustrated in FIG. 11F.

Even for the FIG. 11A–G key identifier panels, sequence prioritized key head outline matching remains critical. First, similar geometry key head outlines have been grouped together on single panels. Second, the operator must perform unknown key to key head matching using the standard left to right matching sequence. For example, in FIG. 11, the head of a "74" key blank will fit into the key head outline and into the slot for blank "67" so the unknown key must be inserted into key blank "74" first.

As a result, key blank "74" must be placed to the left of key blank "67" to prevent misidentification of a "74" key blank. Accordingly, once a match has been obtained for key blank "74," the operator must stop or key blank "74" will be misidentified.

Figure 12A:
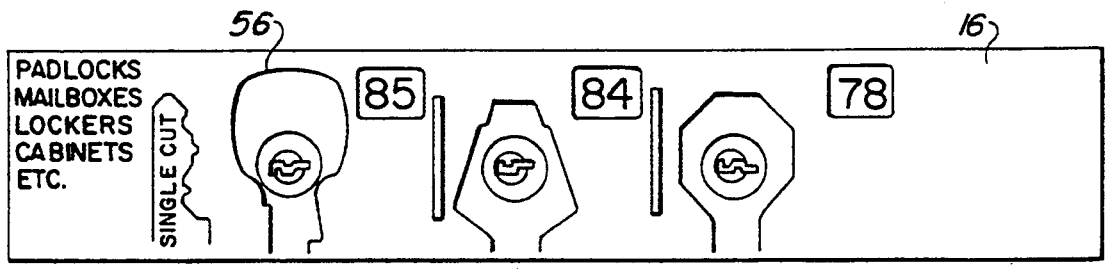
FIGS. 12A–C illustrate the series of three key identification panels used to identify keys for small locks including padlocks, mail boxes lockers, cabinets and others.
Figure 12B:
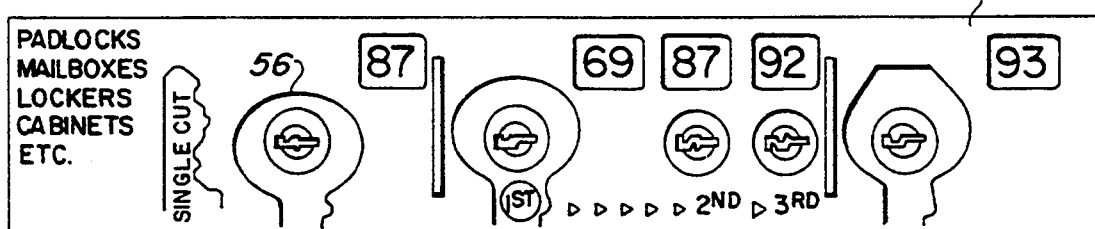
Figure 12C:
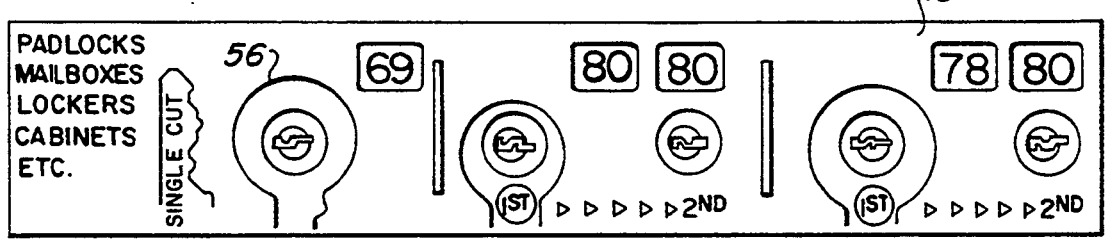

The key identification panels illustrated in FIGS. 12A–12C taken together with the FIG. 19 flow chart illustrate how a group of three key identification panels constitute the third group of key identification panels 14 as illustrated in FIG. 1 and serve to identify a relatively significant universe of small keys intended for applications with padlocks, mailboxes, lockers and cabinets. This third primary classification category of unknown keys is provided by discussions between the key identifier operator and the customer. The secondary classification attribute for this particular primary classification category utilizes key head geometry as was the case with home/office keys.

Because the preferred embodiment of the present invention utilizes the universal key design consolidation techniques disclosed in the co-pending, allowed patent application incorporated by reference, known key blanks having key head and key blade geometry entirely different from the customer's unknown key will often be identified by the key identification process of the preset invention. For example, FIG. 11A illustrates that key blank "77" can be used for two different unknown keys identified on panel 11A as well as for a third unknown key identified on the left hand side of FIG. 11E. See also FIG. 11G which illustrates that key blank "73" can be utilized for two different unknown key configurations. Also note that on FIGS. 11C and 11E, key blank "74" is compatible with two entirely different unknown key configurations.

The utilization of such universal key designs substantially reduces the inventory of key blanks which must be maintained by the key identification operator. A significant feature of the present invention is that, due to the total lack of geometric similarity between the unknown key and such universal key blanks, the key identifier operator cannot and has no need to visually verify correct key identification operation by comparing and matching the geometry of the unknown key to the designated known key blank. Accordingly, the key identifier of the present invention, by providing for sequence-prioritized key identification as generally outlined in FIG. 15 and as more specifically outlined in the FIGS. 17 18 and 19 flow charts, utilizes various sequential key classification procedures to automatically and inherently perform comparison steps without requiring the operator to make any comparisons between the geometry of the unknown key and the geometry of the designated replacement key blank. This totally unique aspect of the present invention sets it apart from all previous manual key identification devices.

For the Category One automotive primary classification, the key identifier operator is not required to visually inspect any aspect of the geometry of the unknown key provided by the customer. For the Category Two home/office unknown keys, and for the Category Three small keys, the key identifier operator does to a very limited extend relate the geometry of the customer's key head to the key head outlines disposed on the relevant key identifier panels. This comparison, however, relates the key head of the unknown key to an element of a key identifier panel and does not involve any comparison between the unknown key and the designated replacement key blank.

The key identifier of the present invention inherently identifies the exact geometry of the original key blank from which the customer's key blank was made. An alternative embodiment of the invention could be made to identify key blanks geometrically identical to the original key blank from which the customer's unknown key came. However, the key identifier of the present invention which utilizes a series of universal key designs and other key designs which are geometrically dissimilar to the original key blank from which the unknown customer key was cut inherently performs an additional step of translating or relating the original key blank design into an alternative key blank design. Accordingly, the key identifier of the present invention could readily be simplified and modified to identify original key blank designs rather than equivalent, non-identical key blank designs.

Although the key identifier of the present invention has been disclosed as being fabricated in a relatively compact rotary unit as illustrated in FIG. 1, the invention could equally well be fabricated on large flat panels incapable of rotation or in any one of numerous other physical embodiments which would be readily be apparent to one of ordinary skill in the relevant art. In addition, although the sequence-prioritized set of slots has been illustrated as being embodied on rectangular panels with a linear slot arrangement, the slots could be positioned on a sequence-prioritized basis in a variety of different geometric arrangements, including circular or serpentine. The linear slot arrangement was selected to improve the user friendliness of the key identifier design.

The key identifier system has been described as a set of three manually rotatable groups of key identifier panels. This manual system could readily be converted to a power driven system and partially automated. For example, an operator could be provided with key selection push buttons designated "Toyota," "Ford," etc. such that actuation of a selected button would automatically designate the proper group of panels and rotate the correct, specific panel into a predefined position, thereby significantly simplifying the key identification process.

A primary benefit realized by the key identifier of the present invention is that completely unskilled employees having no experience whatsoever in key duplication procedures can readily be trained to utilize the key identifier invention to identify a correct key blank capable of being used successfully in a succeeding key duplicating operation with virtual absolute reliability. When the multi-step sequence-prioritized operating mode of the present invention is followed, there is virtually no possibility for error.

Because of the limited number of panels utilized in the preferred embodiment of the invention, a relatively few low population keys, such as Jaguar or Ferarri automotive ignition keys, may have been intentionally excluded from the universe of keys capable of successful identification by the present invention. Such exclusions were carefully planned and were based on commercial realities relating to system size and cost and key blank inventory requirements. More elaborate, higher capacity key identification systems, larger in size and more costly to build, could readily be provided for by using the techniques described above. Accordingly, it is intended by the appended claims to cover all such modifications of the invention which fall within the true spirit and scope of the invention.

I claim:

1. A method for selecting a key blank design functionally compatible with an unknown key having an identified primary classification category, a secondary classification attribute, and a key blade with a defined cross sectional configuration, where the selected key blank design is functionally compatible with, but not necessarily geometrically identical to an original key blank from which the unknown key was cut, comprising the steps of:
   a. identifying the primary classification category of the unknown key to sort the unknown key into a specified primary classification category;
   b. within the specified primary classification category sorting the unknown key by the secondary classification attribute into a specified secondary classification category;
   c. implementing a key blade matching procedure within the specified secondary classification category where the cross sectional configuration of the unknown key blade is compared with at least one cross sectional configuration corresponding to a known blade cross sectional configuration of a known key blank design to determine whether the cross sectional configuration of the unknown key blade matches the known cross sectional configuration;
   d. implementing a sequence-prioritized matching procedure where the cross sectional configuration of the unknown key blade is compared with a sequence-prioritized group of known cross sectional configurations where each cross sectional configuration within the group is different; and e. identifying the known key blank design when the key matching procedure yields a match between the unknown key blade cross sectional configuration and the known cross sectional configuration.

2. The method of claim 1 including the further step of identifying a functionally compatible, but geometrically dissimilar key blank design based on the identified key blank design.

3. The method of claim 1 wherein the unknown key is further sorted within the secondary classification category according to a single cut/double cut key blade geometry classification.

4. The method of claim 3 wherein the unknown key is further sorted within the secondary classification category according to an ignition/door key application category.

5. The method of claim 1 wherein the primary classification category includes a first classification for automobile applications and a second classification for non-automotive application.

6. The method of claim 5 wherein the unknown key is further sorted within the second classification according to a single cut/double cut key blade geometry classification.

7. The method of claim 6 wherein the unknown key is further sorted within the second classification according to key head geometry.

8. The method of claim 1 wherein the cross sectional configuration of the unknown key blade is compared with at least two cross sectional configurations corresponding to the known cross sectional configuration of at least a first known key blank design and a second known key blank design to determine whether the cross sectional configuration of the unknown key blade matches the known cross sectional configuration of the first or second known key blank designs.

9. The method of claim 1 wherein the cross sectional configuration of the unknown key blade is compared with at least two cross sectional configurations corresponding to the known cross sectional configuration of at least a first known key blank design and a second known key blank design to determine whether the cross sectional configuration of the unknown key blade matches the known cross sectional configuration of the first or second known key blank designs.

10. The method of claim 7 wherein the cross sectional configuration of the unknown key blade is compared with at least two cross sectional configurations corresponding to the known cross sectional configurations of at least a first known key blank design and a second known key blank design to determine whether the cross sectional configuration of the unknown key blade matches the known cross sectional configuration of the first or second known key blank designs.

11. The method of claim 1 wherein the key blade matching procedure is implemented by inserting the unknown key blade into a slot having the known cross sectional configuration of the known key blank design.

12. The method of claim 1 wherein the key blade matching procedure is implemented by inserting the unknown key blade into a slot having the known cross section configuration of the known key blank design.

13. The method of claim 7 wherein the key blade matching procedure is implemented by inserting the unknown key blade into a slot having the known cross sectional configuration of the known key blank design.

14. The method of claim 11 wherein the key blade matching procedure is implemented by attempting to insert the unknown key blade into a first slot having a first cross sectional configuration corresponding to a first known key blank and into a second slot having a second cross sectional configuration corresponding to a second known key blank.

15. The method of claim 2 wherein the step of identifying the known key blank design and the step of identifying a functionally compatible, but geometrically dissimilar key blank design are performed simultaneously in a single step.

16. Apparatus for selecting a key blank design functionally compatible with an unknown key having an identified primary classification category, and a key blade with a defined cross sectional configuration, where the selected key blank design is functionally compatible with, but not necessarily geometrically identical to an original key blank from which the unknown key was cut, comprising:

a. a sequence-prioritized set of slots grouped together according to the primary classification category where the cross sectional configuration of each slot corresponds to the cross sectional configuration of a blade of a known key blank design, wherein the slots are configured to enable the cross sectional configuration of the blade of the unknown key to be compared with the cross sectional configuration of each slot on a sequence-prioritized basis to determine whether a match exists between the unknown key blade and a designated slot; and b. means for relating a matched slot to a specified key blank design functionally compatible with the unknown key.

17. The apparatus of claim 16 wherein the blade of the specified key blank design includes a cross sectional configuration both functionally compatible with and geometrically identical to the cross sectional configuration of the blade of the unknown key.

18. The apparatus of claim 16 wherein the cross sectional configuration of the blade of the specified key blank is functionally compatible with, but not geometrically identical to the cross sectional configuration of the blade of the unknown key.

19. The apparatus of claims 16 or 17 wherein the sequence-prioritized set of slots all relate to keys for automotive applications.

20. The apparatus of claim 19 wherein the set of slots is subdivided into a first subset of slots based upon automotive manufacturer name.

21. The apparatus of claim 20 wherein under a specified manufacturer name classification, the slots are subdivided into second and third subsets of slots according to a key blade geometry classification.

22. The apparatus of claim 21 wherein the second subset of slots includes single cut keys and wherein the third subset of slots includes double cut keys.

23. The apparatus of claim 21 wherein the second and third subsets are further subdivided according to key application.

24. The apparatus of claim 23 wherein the key application categories include ignition keys and door keys.

25. The apparatus of claim 20 wherein the first subset of slots is further subdivided according to the names of a group of manufacturers and that group of slots is disposed on a single panel.

26. The apparatus of claim 25 wherein the entire sequence-prioritized set of slots is disposed on a series of substantially identical panels.

27. The apparatus of claim 26 wherein the series of panels is linked together.

28. The apparatus of claim 27 wherein the series of linked panels are configured to be displayed on a single panel at a time basis.

29. The apparatus of claim 28 wherein the series of linked panels are formed as a semi-circular grouping resembling a tank tread.

30. The apparatus of claim 20 wherein each slot includes an elongated key way.

31. The apparatus of claim 16 wherein each of the set of slots includes an elongated key way.

32. The apparatus of claim 31 wherein each of the set of slots is formed on a single panel.

33. The apparatus of claim 32 wherein each slot includes a bullet-shaped indentation positioned along the slot to facilitate entry of the unknown key into the slot.

34. The apparatus of claim 33 wherein the panel includes a rectangular shape having a defined length and width with top and bottom edges.

35. Apparatus for selecting a key blank design functionally compatible with an unknown key having an identified primary classification category, a key head, and a key blade with a defined cross sectional configuration, where the selected key blank design is functionally compatible with, but not necessarily geometrically identical to an original key blank from which the unknown master key was cut, comprising:
   a. a sequence-prioritized set of paired slots and key head outlines grouped together according to the primary classification category where the key head outline corresponds to the outline of a head of a known key blank design and the cross sectional configuration of each paired slot corresponds to the cross sectional configuration of the blade of the same known key blank design, wherein the paired key head outlines and slots are configured to enable the key head and the blade cross sectional configuration of the unknown key to be compared with each key head outline and with the cross sectional configuration of each paired slot on a sequence-prioritized basis to determine whether a match exists between the key head and the blade of the unknown key and a designated key head outline/slot pair; and
   b. means for relating a matching key head outline/slot pair to a key blank design functionally compatible with the unknown key.

36. The apparatus of claim 35 wherein the set of paired slots and key head outlines are formed on a panel having an upper surface and wherein the key head outlines are recessed into the upper surface of the panel defining a perimeter wall and creating a chamber having a base, a sidewall and an open top for receiving the head of the unknown master key.

37. The apparatus of claim 36 wherein the unknown key further includes a shoulder positioned between the key head and blade and wherein the key head outline and chamber further include an additional section corresponding to at least a part of the shoulder of the known key blank design.

38. The apparatus of claim 37 wherein the slot is disposed in the base of the chamber of each key head outline.

39. The apparatus of claims 35 or 38 further including a spaced apart second slot associated with a key head outline/slot pair where the cross sectional configuration of the second slot is dissimilar to the paired slot.

40. The apparatus of claim 39 further including means for relating a matching key head outline/second slot pair to a key blank design functionally compatible with the unknown key.

41. The apparatus of claim 35 wherein the key head outline/slot pairs are subdivided into a first subset of key head outline/slot pairs according to key blade geometry classification.

42. The apparatus of claim 41 wherein the first subset includes single cut keys.

43. The apparatus of claim 42 wherein the key head outline/slot pairs are further subdivided into a second subset of key head outline/slot pairs wherein the second subset includes double cut keys.

44. The apparatus of claim 40 further including a spaced apart third slot associated with each key head outline/slot pair where the cross sectional configuration of the third slot is dissimilar to the paired slot and to the second slot.

45. The apparatus of claim 44 including means for relating a key head outline/third slot pair to a key blank design functionally compatible with the unknown key.

46. The apparatus of claim 35 wherein the blade of the designated key blank design includes a cross sectional configuration both functionally compatible with and geometrically identical to the cross sectional configuration of the blade of the unknown key.

47. The apparatus of claim 35 wherein the cross sectional configuration of the blade of the designated key blank is functionally compatible with, but not geometrically identical to the cross sectional configuration of the blade of the unknown key.

48. Apparatus for selecting a key blank design functionally compatible with an unknown key having an identified primary classification category, and a key blade with a defined cross sectional configuration, where the selected key blank design is functionally compatible with, but not necessarily geometrically identical to an original key blank from which the unknown key was cut, comprising:
   a. a first sequence-prioritized set of slots grouped together according to the primary classification category where the cross sectional configuration of each slot corresponds to the cross sectional configuration of a blade of a known key blank design, wherein the slots are configured to enable the cross sectional configuration of the blade blank of the unknown key to be compared with the cross sectional configuration of each slot on a sequence-prioritized basis to determine whether a match exists between the unknown key blade and a designated slot;
   b. a second sequence-prioritized set of paired slots and key head outlines grouped together according to the primary classification category where the key head outline corresponds to the outline of a head of a known key blank design and the cross sectional configuration of each paired slot corresponds to the cross sectional configuration of the blade of the same known key blank design, wherein the paired key head outlines and slots are configured to enable the key head and the blade cross sectional configuration of the unknown key to be compared with each key head outline and with the cross sectional configuration of each paired slot on a sequence-prioritized basis to determine whether a match exists between the key head and the blade of the unknown key and a designated key head outline/slot pair; and c. means for relating the matched slot and the matching key head outline/slot pair to a key blank design functionally compatible with the unknown key.

49. The apparatus of claim 48 wherein the first sequence-prioritized set of slots all relate to keys for automotive applications.

50. The apparatus of claim 49 wherein the first set of slots is subdivided into a first subset of slots based upon automotive manufacturer name.

51. The apparatus of claim 49 wherein under a specified manufacturer name classification, the first set of slots are subdivided into second and third subsets of slots according to a key blade geometry classification.

52. The apparatus of claim 51 wherein the second subset of slots includes single cut keys and wherein the third subset of slots includes double cut keys.

53. The apparatus of claim 51 wherein the second and third subsets of slots are further subdivided according to key application.

54. The apparatus of claim 53 wherein the key application categories include the ignition keys and door keys.

55. The apparatus of claim 50 wherein the first subset of slots is further subdivided into a fourth subset of slots including the names of a specified group of manufacturers and the fourth subset of slots is disposed on a single panel.

* * * * *